No. 623,524. Patented Apr. 25, 1899.
T. DUNCAN.
ELECTRIC METER.
(Application filed Mar. 24, 1898.)

(No Model.)

Witnesses
Samuel A. Bachtel
Adelaide Kearns.

Thomas Duncan Inventor
By his Attorneys Chapin & Denny

UNITED STATES PATENT OFFICE.

THOMAS DUNCAN, OF FORT WAYNE, INDIANA.

ELECTRIC METER.

SPECIFICATION forming part of Letters Patent No. 623,524, dated April 25, 1899.

Application filed March 24, 1898. Serial No. 674,955. (No model.)

*To all whom it may concern:*

Be it known that I, THOMAS DUNCAN, a citizen of the United States, residing at Fort Wayne, in the county of Allen, in the State of Indiana, have invented certain new and useful Improvements in Electric Meters; and I do hereby declare that the following is a full, clear, and exact description of the invention, which will enable others skilled in the art to which it appertains to make and use the same, reference being had to the accompanying drawings, which form part of this specification.

My invention relates to improvements in induction-motor meters for measuring the energy supplied to inductive and non-inductive translating devices, and has for its object a method of and means for obtaining a magnetic field in quadrature with the impressed electromotive force by producing a single resultant lagging current in a single field-coil representing the volts and with said resultant current establishing a single magnetic field in phase therewith, both of which are displaced ninety degrees from the volt or pressure which they represent.

In meters heretofore in use the practice has been to employ two shunt field-coils, each traversed by a shunt-current and differing in phase from each other, and then combining the magnetic field of each into a resultant magnetic field of the proper phase relation.

In the present invention I employ one shunt field-coil only and supply it with a single current which is a resultant of two other currents, thereby maintaining to said single shunt-coil a single magnetic field in phase with the resultant current.

Figure 1:
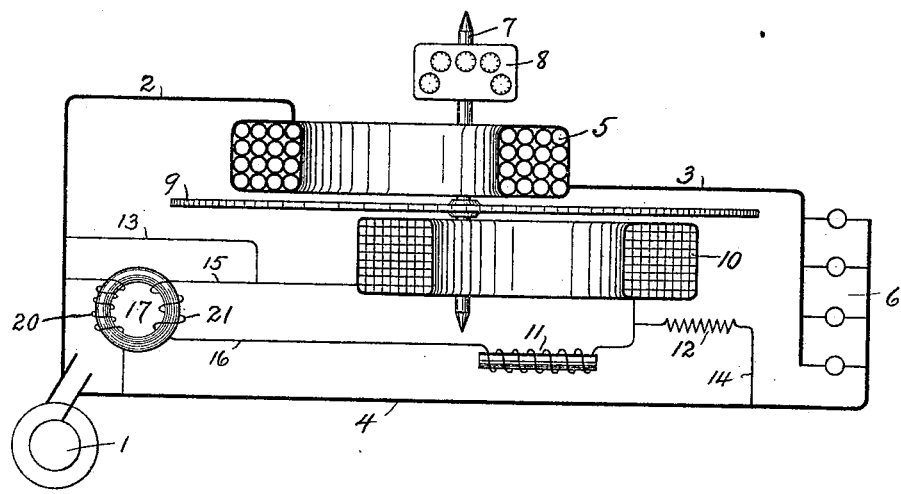
Figure 2:
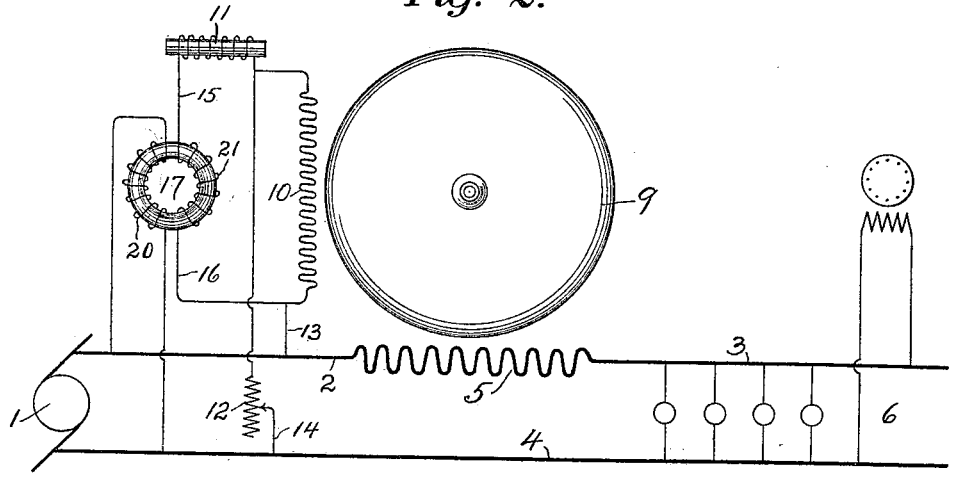

In the accompanying drawings, which form part of this specification and in which similar reference-numerals indicate like parts, Figure 1 is a front elevation showing the series and shunt field-coils in vertical section. Fig. 2 is a diagrammatic view of the invention, showing the relative arrangement and connections of the various circuits.

In describing the invention with reference to Fig. 1, 1 represents a generator of alternating currents as supplying energy to the translating devices 6 by means of the leads 2, 3, and 4. A series field-coil 5 is included in circuit with the lead 2 and which is traversed by all the current supplying the translating devices 6, thereby maintaining or setting up a magnetic field proportional to the amperes flowing through it. Adjacent to the lower face of the coil 6 is a revoluble aluminium disk armature 9, which is suitably mounted upon a spindle 7, the latter being connected in any well-known manner to operate the registering-train 8.

A shunt field-coil 10 is arranged adjacent to the lower surface of the disk armature 9 and is supplied by a current that is proportional to the impressed electromotive force between the leads 2 and 4.

A transformer 17, provided with the usual primary and secondary windings 20 and 21, respectively, and a shunt-circuit 13 and 14, receiving current from the source of pressure, supplies the shunt field-coil 10, as hereinafter set forth.

To accurately measure inductive loads, it is now well understood in the art that the magnetism of the series and ampere field-coil and the magnetism of the shunt or volt field-coil must be in quadrature with each other when the translating devices or load is non-inductive. To accomplish this, the magnetism of the shunt or volt field-coil is lagged to ninety degrees, thereby permitting the torque exerted upon the armature to vary with the sine of the angle between the magnetism of series and shunt fields, respectively.

To obtain a magnetic field in the shunt field-coil 10 that is displaced ninety degrees from the impressed electromotive force, I employ a transformer 17, of any suitable construction, which connects its primary 20 to the source of pressure and its secondary 21 to the terminals of the shunt field-coil 10 by means of the wires 15 and 16. An impedance-coil 11 is included in series with the said secondary 21 and coil 10 to lag the current to as near ninety degrees as is possible; but since a lag of ninety degrees cannot be obtained in this manner, owing to the resistance of the circuit, I employ a shunt-circuit 13 and 14, which also supplies the coil 10 with a current that is practically in phase with the electromotive force to produce a current of the proper lag or ninety degrees. The current from the secondary 21 and that from the shunt-circuit 15 and 16 combine in passing through the coil 10 into a resultant current that is ninety degrees behind the electromotive force at the terminal of the secondary circuit 21.

The proper adjustment to quadrature is made by adjusting the resistance 12 in series with the shunt-circuit 15 and 16 in any convenient manner. This is most easily accomplished by placing a standard wattmeter in circuit with the meter to be calibrated, then passing a certain non-inductive load in watts through both and noting the speed, and then passing an inductive load of the same watts through them and adjusting the resistance 12 until the speed of the meter is the same as the standard or the same on both inductive and non-inductive with a given number of watts.

Fig. 2 shows a cylindrical type of armature which is also employed in lieu of a disk in the manufacture of induction-meters. The resistance 12 in this figure is shown to be adjustable; but this possesses no novelty, as it is invariably used in this manner in the manufacture of meters to permit of dexterity in standardizing. The armature is actuated by a resultant shifting magnetic field that is set up by the magnetism of the series field-coil combining with that of the shunt field-coil in a well-understood manner. The impedance-coil 11, as herein shown, may preferably be substituted by other forms better adapted to this class of work and well known in the art.

What I desire to secure by Letters Patent is—

1. In an induction-motor meter a series coil or coils; a revoluble armature in inductive relation to said series coils; a transformer 17; a shunt-coil 10 receiving currents from the said transformer 17 and also from the supply-mains 2 and 4 in the manner described; a resistance 12 in series with the leads 13 and 14; and an impedance-coil in series with the shunt-coil 10.

2. The herein-described method of obtaining a magnetic field in quadrature with the impressed electromotive force, which consists in establishing a resultant current in a single coil that is supplied by two currents of different time period or phases, one of said currents being supplied by the main line and the other by a transformer, as described.

3. The herein-described process or method of obtaining a magnetic field in quadrature with the impressed electromotive force of the service-mains, which consists in employing two currents of different time periods in a single coil, one circuit being connected to the main line and including a resistance, and the other circuit being connected to the secondary of a transformer which includes an impedance-coil.

4. The herein-described method of obtaining a magnetic field in quadrature with the impressed or line electromotive force, which consists in setting up in a single coil a magnetic field that is the resultant of two currents of different time periods, both of said currents being supplied to the same coil but derived from different sources, one being obtained from the supply-mains and the other from the secondary of a transformer whose primary is connected to the supply-mains.

Signed by me, at Fort Wayne, Allen county, State of Indiana, this 21st day of March, 1898.

THOMAS DUNCAN.

Witnesses:
M. G. WEBBER,
HOMER V. CARPENTER.